United States Patent
Smith et al.

(10) Patent No.: US 6,280,818 B1
(45) Date of Patent: *Aug. 28, 2001

(54) CARPET BACKING COMPONENTS AND METHODS OF MAKING AND USING THE SAME

(75) Inventors: Kirk D. Smith, Fisherville; Gary T. Graves, Afton, both of VA (US)

(73) Assignee: Wayn-Tex, Inc., Waynesboro, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,130

(22) Filed: Mar. 3, 1999

(51) Int. Cl.$^7$ .............................. B32B 3/02; B32B 33/00; D03D 27/00; D04H 11/00; D05C 17/00

(52) U.S. Cl. .............................................. 428/95

(58) Field of Search ................................ 428/95

(56) References Cited

U.S. PATENT DOCUMENTS

| | | |
|---|---|---|
| 2,713,012 | 7/1955 | Harstein . |
| 3,110,905 | 11/1963 | Rhodes ................... 139/391 |
| 3,285,797 | 11/1966 | Harrison et al. ........... 161/67 |
| 3,309,259 | 3/1967 | Schwartz . |
| 3,317,366 | 5/1967 | Dionne ..................... 161/66 |
| 3,325,323 | 6/1967 | Forkner .................... 156/72 |
| 3,348,993 * | 10/1967 | Sissons . |
| 3,443,541 | 5/1969 | Chopra ................... 112/410 |
| 3,535,192 | 10/1970 | Gamble ................... 161/66 |
| 3,542,632 | 11/1970 | Eickhoff . |
| 3,605,666 * | 9/1971 | Kimmel et al. ........... 112/410 |
| 3,607,599 | 9/1971 | McPherson ............. 161/144 |
| 3,642,516 | 2/1972 | Gasaway et al. ......... 117/65.2 |
| 3,817,817 * | 6/1974 | Pickens et al. .......... 161/67 |
| 3,922,454 | 11/1975 | Roecker . |
| 4,096,302 | 6/1978 | Thibodeau et al. ....... 428/95 |
| 4,112,161 | 9/1978 | Sorrells .................. 428/95 |
| 4,140,071 * | 2/1979 | Gee et al. ............... 112/266 |
| 4,342,802 | 8/1982 | Pickens, Jr. et al. ..... 428/92 |
| 4,389,434 | 6/1983 | Polman . |
| 4,389,443 | 6/1983 | Thomas et al. .......... 428/92 |
| 4,426,415 | 1/1984 | Avery . |
| 4,439,476 * | 3/1984 | Guild ..................... 428/96 |
| 4,478,900 | 10/1984 | Nebe et al. .............. 428/92 |
| 4,556,602 | 12/1985 | Williams ................. 428/259 |
| 4,705,706 | 11/1987 | Avery . |
| 4,822,658 | 4/1989 | Pacione . |
| 4,871,603 | 10/1989 | Malone ................... 428/95 |
| 4,872,930 | 10/1989 | Kajikawa et al. ........ 156/72 |
| 4,906,520 | 3/1990 | Kumar .................... 428/225 |
| 5,030,497 | 7/1991 | Claessen ................. 428/95 |
| 5,034,258 | 7/1991 | Grace .................... 428/78 |
| 5,198,277 | 3/1993 | Hamilton et al. ........ 428/92 |
| 5,216,790 | 6/1993 | Eschenbach et al. ..... 28/112 |
| 5,244,718 | 9/1993 | Taylor et al. ........... 428/229 |
| 5,348,785 | 9/1994 | Vinod .................... 428/95 |
| 5,380,574 | 1/1995 | Katoh et al. . |
| 5,464,677 | 11/1995 | Corbin et al. ........... 428/95 |
| 5,470,648 | 11/1995 | Pearlman et al. . |

(List continued on next page.)

FOREIGN PATENT DOCUMENTS

WO 98/38375 * 9/1998 (GB) .
09807 12/1998 (WO) .

Primary Examiner—Terrel Morris
Assistant Examiner—Norca L. Torres
(74) Attorney, Agent, or Firm—Dority & Manning, P.A.

(57) ABSTRACT

A carpet backing, such as a primary carpet backing is a composite material comprising a woven fabric mechanically coupled to a bonded non-woven fabric. The woven fabric component may include monofilament warp yarns and monofilament fill yarns. The yarns may be woven using a plain weave. The bonded non-woven fabric component comprises synthetic fibers. The carpet backing combines the dimensional stability of non-woven fabric backings and the healability of woven fabric backings.

22 Claims, 2 Drawing Sheets

U.S. PATENT DOCUMENTS

| | | |
|---|---|---|
| 5,484,639 | 1/1996 | Woodall et al. .................. 428/95 |
| 5,520,962 | 5/1996 | Jones, Jr. ..................... 427/393.4 |
| 5,558,916 | 9/1996 | Heim et al. .................... 428/95 |
| 5,604,009 | 2/1997 | Long et al. ..................... 428/95 |
| 5,612,113 | 3/1997 | Irwin, Sr. ......................... 428/95 |
| 5,630,896 * | 5/1997 | Corbin et al. .................. 156/72 |
| 5,654,066 | 8/1997 | Pacione ............................. 428/95 |
| 5,714,224 | 2/1998 | Gerry et al. ................... 428/95 |
| 5,756,152 | 5/1998 | Lin et al. ..................... 427/207.1 |
| 5,763,040 | 6/1998 | Murphy et al. ................ 428/96 |
| 5,800,898 | 9/1998 | Gerry ............................. 428/95 |
| 5,834,087 | 10/1998 | Kajikawa et al. ............. 428/95 |
| 5,866,229 | 2/1999 | Gartner et al. ................ 428/114 |
| 5,962,101 | 10/1999 | Irwin, Sr. et al. . |
| 6,060,145 * | 5/2000 | Smith et al. ................... 428/95 |
| 6,207,599 * | 3/2001 | Coolen et al. ................. 442/242 |

* cited by examiner

CARPET BACKING COMPONENTS AND METHODS OF MAKING AND USING THE SAME

FIELD OF THE INVENTION

The present invention involves carpet backing components and a method of manufacturing and using such components.

BACKGROUND OF THE INVENTION

Conventional carpets are generally constructed by inserting a piling yarn through a primary backing fabric (also referred to herein as "primary carpet backing" or "primary backing", to form tufts of yarn which project from the surface of the fabric. The piling yarn may be inserted through the use of a tufting needle, which penetrates the primary carpet backing. The primary backing is then coated with an adhesive to secure the yarn to the primary backing, and to allow a secondary carpet backing (or "secondary backingy") to be affixed to the primary backing. A primary backing may be made of a woven fabric, or may be made of a non-woven fabric.

One type of conventional primary carpet backing may comprise a woven fabric, made of warp yarns and fill yarns. The term "fill yarn" may also be known as a "weft yarns" or "woof yarn." Woven carpet backings are easier to process through tufting than non-woven carpet backings and have the to "heal" from tufting penetrations. The term "heal" refers to the hole caused by a tufting needle closing once the needle is removed from the backing.

Woven carpet backings, however, suffer from a drawback i.e., a woven fabric backing can skew and bow as the warp and fill yarns shift position in relationship to each other. Skewing and bowing can show up as defects when patterns are tufted into a carpeting. Such defects may be especially apparent when long lengths of carpeting are required.

Another conventional primary carpet backing comprises a non-woven fabric. A non-woven fabric is usually defined as an assembly of textile fibers joined by mechanical interlocking in a random web or mat. Fibers may also be joined by fusing (in the case of thermoplastic fibers) or by bonding with a cementing medium, such as starch, glue, casein, rubber, latex, a cellulose derivative, or a synthetic resin. Non-woven fabrics generally have greater dimensional stability than woven fabrics, thereby lessening the chance of defects when patterns are used in a carpet. Non-woven carpet backings generally have weights of about 4 oz./yd.$^2$.

Non-woven fabric backings, however, suffer from a drawback, i.e., that the non-woven fabric does not heal after penetration of a tufting needle. The use of non-woven fabric backings may lead to increased tufting machine maintenance costs due to damage and friction on the tufting needle.

One type of a secondary carpet backing, designed to prevent bleed-through and sold by Shaw Industries, appears to be a composite material consisting of a woven fabric ("or woven component") mechanically coupled to a non-woven fabric (or "non-woven component"). The woven component consists of monofilament warp yarns, and spun fill yarns. These yarns are woven into a leno weave with a construction estimated at 16 ends per inch (warp yarns) and 5.5 picks per inch (fill yarn). The non-woven component can be a 3 oz./yd.$^2$ weight needle-punched fabric. The fiber used in the non-woven component appears to be polypropylene, with an estimated fiber denier range from 4 to 6 inches, and an estimated fiber length ranging from 2½ to 3 inches in length.

SUMMARY OF THE INVENTION

An object of the invention is to overcome these and other drawbacks in existing floor backing components.

Another object of the invention is to provide a backing for floor coverings that combines increased healability with increased dimensional stability.

Another object of the invention is to provide a backing for a floor covering that eases the tufting process in manufacturing a floor covering.

Another object of the invention is to provide a backing or a floor covering that lessens the chance of defects for floor coverings with patterns.

Another object of the invention is to provide a backing for a floor covering that reduces tufting machine maintenance costs.

These and other objects of the invention are accomplished according to various embodiments of the invention. One embodiment of the invention provides a carpet backing component ("carpet backing" or "backing component") comprised of a woven fabric component (a "woven fabric" or a "woven component") and a non-woven fabric component (a "non-woven fabric" or a "non-woven component"), with the two components being joined, e.g., mechanically joined together. The woven component comprises monofilament warp yarns and monofilament fill yarns. The invention combines the dimensional stability of non-woven fabrics with the healability of woven fabrics.

Another embodiment of the invention provides a method of using a floor covering comprising tufted pile yarns inserted into a backing component. The method comprises forming a backing component by attaching a woven fabric to a non-woven fabric. The woven fabric is comprised of monofilament warp yarns and monofilament fill yarns, and the non-woven fabric comprises synthetic fibers. The woven component and the non-woven component are mechanically joined. Subsequently, carpet yarns are tufted through the backing component to form the floor covering, which is placed on an area of the floor. The carpet backing component of the invention is preferably used as a primary carpet backing. While the tufted primary carpet backing of the present invention may be used alone as a floor covering, a secondary backing may be affixed to the back of the primary carpet backing of the invention.

Another embodiment of the invention provides a method for making a carpet backing comprising joining a woven fabric component, comprising monofilament warp yarns and monofilament fill yarns, to a non-woven component. The non-woven component preferably includes synthetic fibers.

These and other objects of the present invention shall become apparent from the accompanying drawings and detailed description of the invention which follows.

DETAILED DESCRIPTION OF THE PREFERRED EMBODIMENTS

The carpet backing may be used as a primary carpet backing. Nonetheless, the characteristics and parameters pertaining to the primary carpet backing are equally applicable to other floor coverings or floor covering components.

The primary backing of the invention is used to provide a finished floor covering (e.g., a carpet) with increased healability and increased dimensional stability. The primary backing may be tufted with pile yarns in a conventional manner to form a tufted carpet, and a secondary carpet backing may be joined to the tufted carpet using an adhesive, such as any adhesive conventionally used in floor coverings e.g., a latex mixture.

Figure 1:
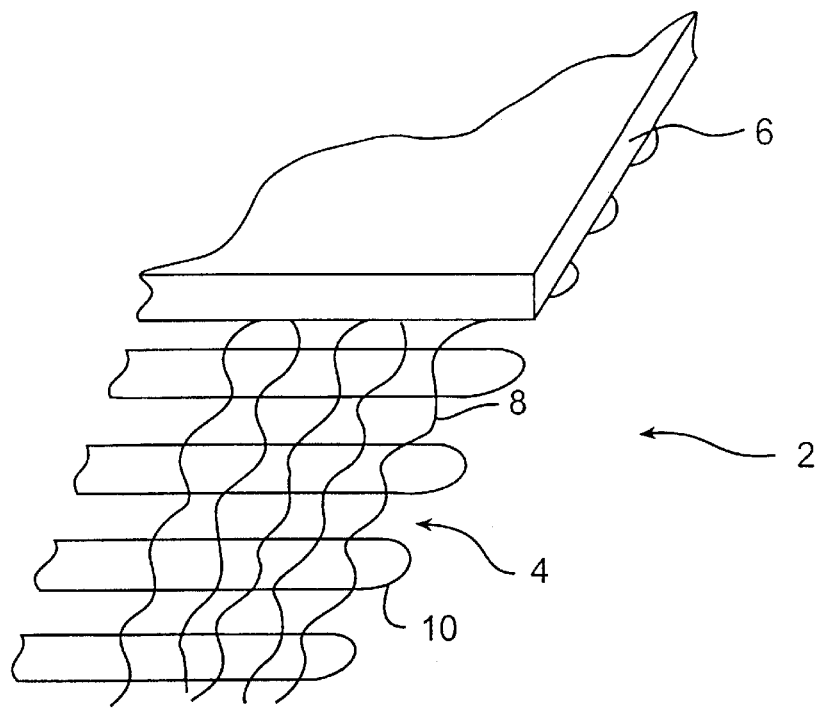
FIG. 1 is an illustration of a primary backing according to an embodiment of the present invention.

In one embodiment of the invention, as illustrated in FIG. 1, the primary carpet backing (2) is a composite material comprising a woven fabric component (4) mechanically coupled to a non-woven fabric component (6). The woven fabric component (4) includes monofilament warp yarns (or "fibers") (10) and monofilament fill yarns (or "fibers") (8). In one embodiment of the invention these yarns are woven using a plain weave with a typical construction of about 20 to about 35 ends (i.e. yarns) per inch, preferably about 20 to about 30 ends per inch, more preferably about 23 to about 28 ends per inch, and most preferably about 24 ends per inch (warp yarns), and about 10 to about 30 picks (i.e. yarns) per inch, preferably about 11 to about 18 picks per inch, more preferably about 15 to about 18 picks per inch and most preferably about 15 picks per inch (fill yarns). In one embodiment of the invention, warp yarns of the woven component may range in size from about 250 to about 650 denier, preferably about 400 to about 500 denier, and more preferably about 450 denier, and fill yarns may range in size from about 500 to about 1500 denier, preferably about 900 to about 1100 denier, and more preferably about 1000 denier. The monofilament warp and fill yarns may be made of synthetic fibers, such as polypropylene, nylon, polyester, or polyethylene. In one embodiment, the monofilament warp yarns are made of polypropylene and monofilament fill yarns are made of polypropylene. According to an embodiment of the invention, the woven component weights may have a range from about 2 oz./yd.$^2$ to about 8 oz./yd.$^2$, and preferably about 3 oz./yd.$^2$ to about 5 oz./yd.$^2$ The primary backing of the invention and its woven and non-woven components may be characterized by certain properties. Measurement of some of such properties is defined in the art, as discussed below. The quantification of other properties is discussed herein. Dimensional stability may be quantified by determining the load (in pounds) necessary to incur a five percent elongation when the primary backing (the woven component or the non-woven component, respectively) is grabbed and pulled at a 45 degree angle. Dimensional strength may be quantified by determining the load (in pounds) necessary to break the primary backing (the woven component or the non-woven component, respectively) when the primary backing (the woven component or the non-woven component, respectively) is grabbed and pulled at a 45 degree angle. The terms "grabbed" and "pulled" as used herein in connection with the description of the properties of the primary carpet backing of the invention and its woven and non-woven components are defined in ASTM Test Method D4632, (1991), discussed more fully below.

The primary carpet backing of the invention may have dimensional stability ranging from about 2.5 pounds to about 22 pounds, preferably about 3.0 pounds to about 20 pounds and more preferably about 10 pounds to about 20 pounds. The primary carpet backing of the present invention may have a dimensional strength ranging from about 75 pounds to about 200 pounds, and preferably about 90 pounds to about 185 pounds. A five percent elongation may occur in the primary carpet backing of the invention when it is grabbed and pulled along the warp yarns at a load ranging from about 18 pounds to about 45 pounds, and preferably about 19 pounds to about 40 pounds. The primary carpet backing of the invention may break when it is grabbed and pulled along the warp yarns at a load ranging from about 25 pounds to about 200 pounds, and preferably about 75 pounds to about 150 pounds. A five percent elongation when the primary carpet backing of the invention is grabbed and pulled along the fill yarns may occur at a load of about 30 pounds to about 55 pounds. The primary backing may break when it is grabbed and pulled along the fill yarns at a load of about 75 pounds to about 150 pounds and preferably about 80 to about 125 pounds.

The woven component of the primary carpet backing of the present invention may have dimensional stability ranging from about 0 pounds to about 3 pounds, and preferably about 2 pounds to about 3 pounds. The woven component of the primary carpet backing of the present invention may have a dimensional strength ranging from about 80 pounds to about 200 pounds, and preferably about 100 pounds to about 150 pounds. A five percent elongation may occur in the woven component of the primary carpet backing of the invention when it is grabbed and pulled along the warp yarns at a load ranging from about 15 pounds to about 45 pounds, and preferably about 20 pounds to about 30 pounds. The woven component of the primary carpet backing of the invention may break when it is grabbed and pulled along the warp yarns at a load ranging from about 50 pounds to about 200 pounds, and preferably about 75 pounds to about 150 pounds. A five percent elongation may occur when the woven component is grabbed and pulled along the fill yarns at a load of about 15 pounds to about 45 pounds, and preferably about 20 to about 40 pounds. The woven component of the primary backing may break when it is grabbed and pulled along the fill yarns at a load of about 50 pounds to about 200 pounds, and preferably about 75 to about 150 pounds.

Figure 2:
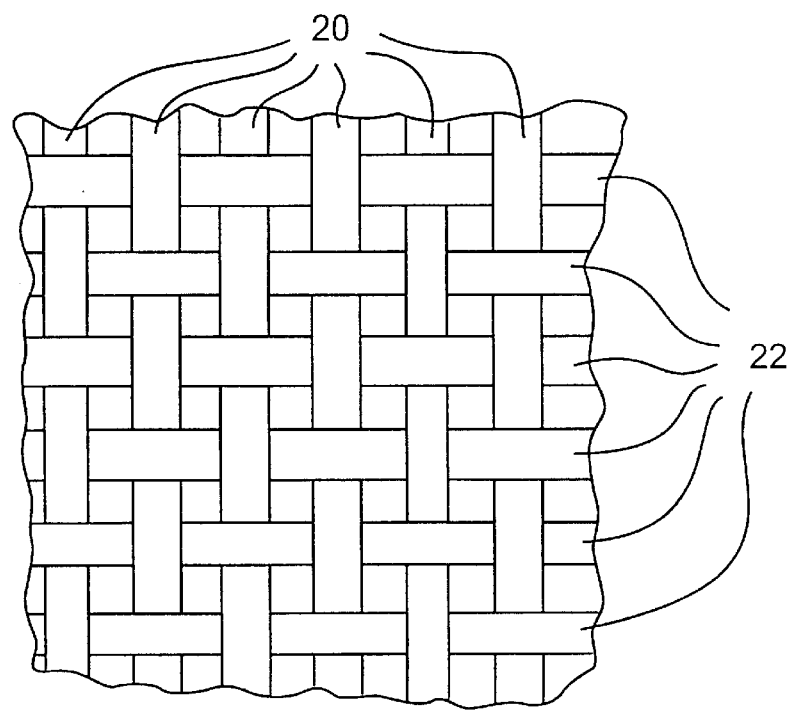
FIG. 2 is an illustration of a plain weave.

The monofilament yarns, i.e. single, untwisted filaments, may be woven in a plain weave. As illustrated in FIG. 2, a plain weave comprises warp yarns (20) and till yarns (22). A plain weave may be made by passing a fill yarn (22) over a first warp yarn (20), and then under the next warp yarn (20), continuing alternately over and under (i.e., across) the warp yarns (20). The next fill yarn (22) passes under the first warp yarn, over the next warp yarn (20), also continuing, alternately across the warp yarns. The remaining fill yarns are then woven in the same alternating fashion. Other types of weaving, known to those of ordinary skill in the art, may be used to form the woven fabric component. Such other types of weaving include leno weave, twill weave or basket weave.

The non-woven component may comprise according to an embodiment of the invention, continuous synthetic fibers generally ranging in size from about 5 denier to about 30 denier. The non-woven component weights may have a range from about 0.25 oz./yd.$^2$ to about 5 oz./yd.$^2$, preferably about 0.50 oz./yd.$^2$ to about 3 oz./yd.$^2$, and more preferably about 0.75 oz./yd.$^2$ to about 3.0 oz./yd.$^2$ The continuous fibers may be made of synthetic fibers, such as polypropylene, nylon, polyester, or polyethylene. In one embodiment, the continuous fibers are made of polypropylene.

A non-woven component of the present invention may have dimensional stability ranging from about 2 pounds to about 30 pounds and preferably about 3.0 pounds to about 28 pounds. The dimensional strength of the non-woven component may range from about 10 pounds to about 80 pounds, and preferably about 20 pounds to about 70 pounds. A five percent elongation may occur in the non-woven component when it is grabbed and pulled along the machine direction at a load ranging from about 4 pounds to about 35 pounds, and preferably about 4.0 pounds to about 33 pounds.

The non-woven component may break when it is grabbed and pulled along the machine direction at a load ranging from about 15 pounds to about 100 pounds, and preferably about 20 pounds to about 95 pounds. A five percent elongation may also occur in the non-woven component when it is grabbed and pulled along the cross-machine (or "transverse") direction at a load of about 3 pounds to about 35 pounds, and preferably about 3.0 pounds to about 33 pounds. The non-woven component may break when it is grabbed and pulled along the cross-machine (or "transverse") direction at a load of about 10 pounds to about 120 pounds, and preferably about 15 pounds to about 110 pounds.

According to an embodiment of the invention, the non-woven component may be made by a spunbonded process. A spunbonded process may comprise extruding fibers through a spinerette onto a moving belt. The fibers may be in a semi-liquid state when initially extruded from the spinerette. Fibers are blown with air so that the fibers overlap each other. As the fibers solidify, fibers may be calendared together by passing a calendar, or roller, over the fibers to press them together. Calendering is the mechanical process of fusing fibers together using pressure and heat. A roller or to rollers may be used which are smooth, or have patterns which may be called "nipples." Webs of fibers may be passed between heated rollers. A "nip" is the line or area of contact between a roller and the web of fibers. The fibers are joined or "nipped" at the raised portion or "nipples" if the rollers have a pattern or joined at substantially all areas if the rollers are smooth. The stiffness or rigidity of the non-woven component increases as more fibers are bonded. The percentage of fibers which are bonded in a non-woven component may range from about 30% bonded to about 100% bonded. Non-woven fabrics made by other processes may be used, such as, for example, a needle-punched non-woven fabric, or other non-woven fabrics.

Figure 3:
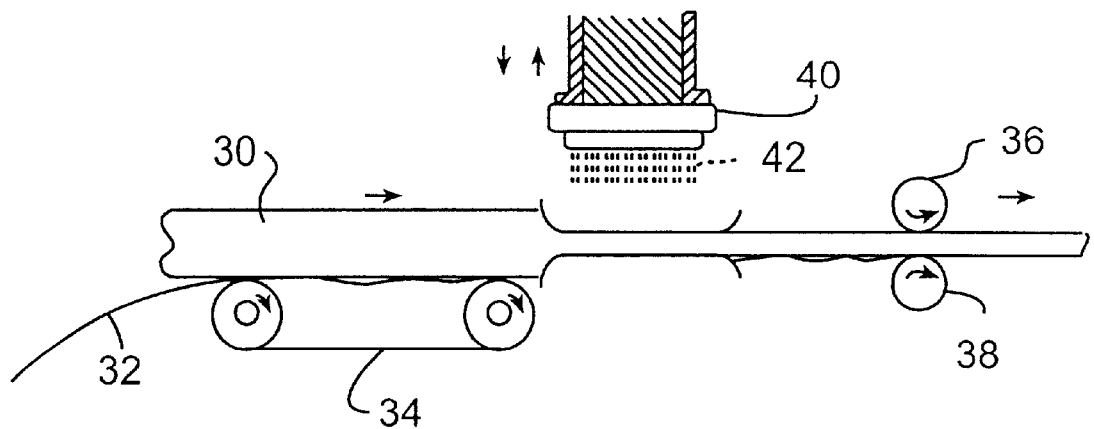
FIG. 3 is an illustration of a needle loom being used to join a woven component and a non-woven component according to an embodiment of the present invention.

The woven fabric component may be joined to the non-woven fabric component by numerous methods. In one embodiment, the two components are joined using a mechanical entanglement process known as needling or needle punching. FIG. 3 illustrates a needle loom for mechanically coupling the two components together. The non-woven component (30) and the woven component (32) travel along a conveyor belt (34) with rollers (36, 38) pulling the two components along. The non-woven component (30) is located atop the woven component (32). A needle board (40) having a plurality of needles (42) is located above the two components. The needles (42) punch the fiber of the non-woven component (30) into the woven component (32) and withdraw. The fibers are left entangled in the woven component (32). In one embodiment, the needles (42) are barbed needles. In other embodiments, the needles are spaced in a nonaligned arrangement.

By varying the strokes per minute of the needles the degree of penetration of the needles, and/or the advance rate of the non-woven or other components a wide range of the primary carpet backing composite properties e.g. strength, and adhesion, between the woven component and the non-woven component may be obtained. Without wishing to be bound by any theory of operability, it is believed that adhesion between components may be increased with increased needling. It is believed, however, that the strength of the joined components, may decrease with increased needling, due to damage to the components e.g. holes in the components. The needling of the components may be adjusted to optimize the strength and adhesion characteristics of the carpet backing according to the desired use of the carpet backing, The components of the primary backing of the present invention may have needling ranging from about 200 punches per square inch to about 600 punches per square inch, preferably about 300 punches/in.$^2$ to about 400 punches/in.$^2$, and more preferably about 325 punches/in.$^2$ Other methods of joining the non-woven component and the woven component may be used, including other known mechanical methods and adhesives.

Additionally, as the carpet backing of the invention, after it has had a piling yarn inserted, is joined to a secondary carpet backing by standard processing machines, latex used in the joining process may further join the non-woven component and the woven component together. One type of secondary carpet backing that may be joined to the primary backing of the present invention is described in U.S. patent application Ser. No. 09/233,321, which is incorporated herein by reference. Any other secondary carpet backing may be used.

Figure 4:
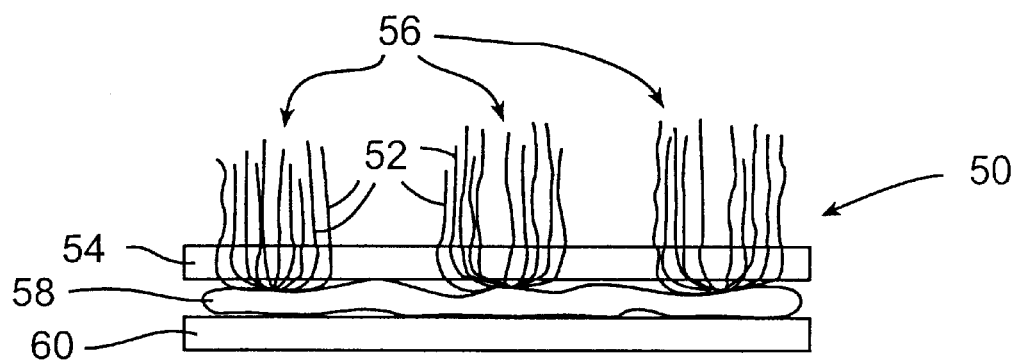
FIG. 4 is an illustration of a carpet made with a primary backing according to an embodiment of the present invention.

FIG. 4 illustrates a carpet using the present invention. A carpet component (50) may be generally constructed by inserting a piling yarn (52) through a primary backing (54) of the present invention to form tufts of yarn (56) which project from the surface of the primary backing (54). The primary backing (54) is then coated with an adhesive (58) to secure the yarn (52) to the primary backing (54), and to allow a secondary backing (60) to be affixed to the primary backing (54).

The primary backing of the invention improves carpet backing components by providing balance between healability and dimensional stability in carpeting and floor coverings. The non-woven component provides stability and stiffness while the woven component provides healability. The primary carpet backing also reduces the maintenance required for tufting machines, as the lighter non-woven component may reduce wear and friction on the tufting needle as compared to 100% non-woven components. The ratio of woven component weight and non-woven component weight may be adjusted to achieve desired characteristics of the primary carpet backing. The ratio of the woven component weight and non-woven component weight may range from about 1 to about 5, and preferably about 1.0 to about 4.5.

The physical characteristics of carpet backings of the invention and carpet backing components may be quantified by grabbing and pulling the backing or components, respectively, and measuring the load in pounds required to achieve a specific result. Thus, "Warp Grab Strength" is measured by pulling a backing or component along the warp yarns, and measuring the load (in pounds) required to break the backing or component, "Warp Grab Load @ 5% Elongation" is measured by pulling a backing or component along the warp yarns and measuring the load (in pounds) required to elongate the backing or component by 5 percent. These same tests may be performed along the fill yarns in which case they are referred to as "Fill Grab Strength" and "Fill Grab Load @ 5% Elongation", respectively. When measuring a non-woven fabric, tests may be performed along the machine direction, e.g., the direction in which the non-woven fabric comes off a processing machine, and along the cross-machine (or transverse) direction.

Dimensional stability may be quantified by measuring the load when the primary carpet backing or carpet backing component is pulled at a 45 degree angle in relation to the warp and fill yarns of the woven component (or machine and cross-machine directions of the non-woven component), "Grab @ 45 degree angle Strength" is measured by pulling the backing or a component at a 45 degree angle in relation to the warp and fill yarns (or machine and cross-machine directions), and measuring the load required to break the backing or component, "Grab @ 45 degree angle load @ 5% Flongation" is measured by pulling the backing or a component at a 45 degree angle in relation to the warp and fill yarns (or machine and cross-machine directions), and measuring the load required to elongate the backing or component by 5 percent.

The measurements of the aforementioned properties can be performed under the ASTM lest Method D4632 protocol of 1991 for testing fabrics, except for the "Grab @ 45 degree angle Strength" test and the "Grab @ 45 degree angle load @ 5% Elongation" test. These two tests are conducted substantially under the ASTM Test Method D4632 protocol of 1991, except that the fabric is cut at a 45 degree angle to the warp yarns and fill yarns of the woven component (or machine or cross-machine directions of the non-woven component), and then pulled in the manner described in the ASTM Test Method D4632 protocol of 1991.

The invention is further illustrated in the following examples. These examples are not intended to be limiting, but rather to illustrate some of the properties and characteristics of the invention.

EXAMPLES

The Examples, as summarized in Table 1, describe the physical characteristics of three examples of the primary backing according to the present invention, as well as a standard woven primary carpet backing. The standard woven primary carpet backing comprises polypropylene warp yarns with 24 ends per inch and a size of 475 denier, and polypropylene fill yarns with 15 picks per inch and a size of 850 denier.

A woven component having the same composition as the standard primary carpet backing was then bonded to three non-woven components to form Sample "A", Sample "B", and Sample "C" of the primary backing of this invention. The non-woven components of Sample "A" and Sample "B" were made of Typar™, a non-woven fabric made of polypropylene fibers and produced by DuPont. The non-woven component of Sample "C" was made of Reicoweb™, a non-woven fabric made from polypropylene fibers and produced on spunbonded machines manufactured by Reifenhäuser GmbH & Co. Referencing Table 2 the weight of the non-woven component in Sample "A" is 3.0 oz./yd.$^2$, in Sample "B" 1.9 oz./yd.$^2$ and in Sample "C" 0.75 oz./yd.$^2$.

All three non-woven components were joined to the woven component by needlepunching. The needlepunching was carried out at a line speed of 34 feet per minute, and a loom speed of 534 RPM, resulting in a needling of about 325 punches per square inch. The needlepunching process used a needle penetration depth of 8 mm, with one needle board using a (L) Foster 850 needles and another needle board using (R) Foster 195 needles.

TABLE 1

| PROPERTIES | Standard Woven Primary Carpet Backing Properties (24 × 15) | Sample "A" | Sample "B" | Sample "C" |
| --- | --- | --- | --- | --- |
| Warp Grab Strength (lbs.) | 119 | 72 | 60 | 36 |
| Warp Grab Load @ 5% Elongation (lbs.)* | 24 | 39 | 31 | 20.6 |
| Fill Grab Strength (lbs.) | 158 | 119 | 90.4 | 81 |
| Fill Grab Load @ 5% Elongation (lbs.)* | 36 | 51 | 37 | 32 |
| Grab @ 45 degree angle Strength (lbs.) | 116 | 182 | 125 | 93 |
| Grab @ 45 degree angle load @ 5% Elongation (lbs.)* | 2.96 | 19.3 | 11.8 | 3.50 |
| Weight Ratio (Woven weight/nonwoven weight) | NA | 1.10 | 1.74 | 4.13 |

Table 2 describes the physical characteristics of the three non-woven components used in the Examples of the primary carpet backing of the present invention, as well as a standard woven primary carpet backing.

TABLE 2

| PROPERTIES | Standard Woven Primary Carpet Backing Properties (24 × 15) | Nonwoven Component in sample "A" | Nonwoven Component in sample "B" | Nonwoven Component in sample "C" |
| --- | --- | --- | --- | --- |
| Warp Grab Strength (lbs.) | 119 | 93 | 67 | 24 |
| Warp Grab Load @ 5% Elongation (lbs.)* | 24.0 | 32.9 | 20.2 | 4.7 |
| Fill Grab Strength (lbs.) | 158 | 100 | 55 | 18 |
| Fill Grab Load @ 5% Elongation (lbs.)* | 36 | 29.6 | 16.9 | 3.4 |
| Grab @ 45 degree angle Strength (lbs.) | 116 | 69 | 57 | 18 |
| Grab @ 45 degree angle load @ 5% Elongation (lbs.)* | 2.96 | 26.0 | 16.3 | 3.80 |
| Weight (oz/yd2) | 3.3 | 3.0 | 1.9 | 0.75 |

*Indicates physical properties that add to fabric stability. The higher the load to elongate the material 5%, the more stable the product.

As demonstrated by the above data, the primary backing of the present invention has a higher dimensional stability than a standard woven primary carpet backing, as illustrated by the improved load measurements for "Grab @ 45 degree angle load @ 5% Elongation." This improved dimensional stability is believed to be a function of the dimensional stability of the non-woven component of the primary carpet backing.

As illustrated by comparing Table 1 and Table 2, the dimensional stability of the primary carpet backing correlates with the dimensional stability of the non-woven component. The more stable the non-woven component, the more stable the primary backing of the invention, see particularly the data for Grab @ 45 degree angle load @ 5% Elongation. As noted previously, the standard woven primary carpet backing is the same as the woven component used to make the carpet backing of the present invention in the examples. Joining this woven component with a non-woven component, however, increases the dimensional stability of the primary carpet backing of the present invention as compared to the standard woven primary carpet backing. Such standard woven primary carpet backings have Warp Grab Load @ 5% Elongation of about 15 pounds to about 40 pounds, Fill Grab Load @ 5% Elongation of about 14 pounds to about 40 pounds, and Grab @ 45 degree angle load @ 5% Elongation of about 2 pounds to about 5 pounds.

Other embodiments and uses of the invention will be apparent to those skilled in the art from consideration of the specification and practice of the invention disclosed herein. The specification and examples should be considered exemplary only. The scope of the invention is defined by the claims appended hereto and their equivalents.

What is claimed is:

1. A method of making a carpet comprising the steps of:
forming a primary backing by needle-punching a woven fabric component having warp and fill yarns to a bonded non-woven fabric component, wherein the weight ratio of the woven fabric component to the non-woven fabric component is between about 1 to about 5, said backing having a dimensional stability of about 3 pounds to about 20 pounds, wherein the dimensional stability is determined by grabbing and pulling the backing at a 45 degree angle in relation to the warp and fill yarns of the backing such that the backing incurs approximately a 5% elongation; and thereafter, inserting a piling yarn through the primary backing.

2. The method according to claim 1, wherein the needle-punching has a needling range of about 300 punches per square inch to about 400 punches per square inch.

3. The method according to claim 1, wherein the needle-punching has a needling range of about 300 punches per square inch to about 400 punches per square inch.

4. The method according to claim 1, wherein the non-woven fabric component has weight of about 0.25 ounces per square yard to about 5 ounces per square yard.

5. The method according to claim 1, wherein the woven fabric component has a weight of about 2 ounces per square yard to about 8 ounces per square yard.

6. The method according to claim 1, wherein the woven fabric component comprises warp yarns having about 20 to about 35 ends per inch and fill yarns having about 10 to about 30 picks per inch.

7. The carpet of claim of 1, further comprising a secondary backing attached to the primary backing.

8. The method according to claim 1, further comprising forming a secondary backing and securing the primary backing to the secondary backing.

9. A method of making a carpet comprising the steps of:
forming a primary backing by needle-punching a woven fabric component having warp and fill yarns to a bonded nonwoven fabric component, said woven fabric component having a weight of about 2 ounces per square yard to about 8 ounces per square yard and a weave construction of between about 20 ends per inch to about 35 ends per inch and between about 10 picks per inch to about 30 picks per inch, wherein said warp yarns, said fill yarns, or combinations thereof comprise synthetic fibers, wherein the weight ratio of said woven fabric component to said nonwoven fabric component is between about 1 to about 5, wherein said primary backing has a dimensional stability of about 3 pounds to about 20 pounds as determined by grabbing and pulling the backing at a 45 degree angle in relation to the warp and fill yarns of the backing such that the backing incurs approximately a 5% elongation; and thereafter, inserting a piling yarn through the primary backing.

10. The method of claim 9, wherein said woven fabric component has a weight of between about 3 ounces per square yard to about 5 ounces per square yard.

11. The method of claim 9, wherein said nonwoven fabric component has a weight of between about 0.25 ounces per square yard to about 5.0 ounces per square yard.

12. The method of claim 9, wherein said nonwoven fabric component has a weight of between about 0.5 ounces per square yard to about 3 ounces per square yard.

13. The method of claim 9, wherein said nonwoven fabric component has a weight of between about 0.75 ounces per square yard to about 3.0 ounces per square yard.

14. The method of claim 9, wherein said synthetic fibers comprise polypropylene.

15. The method of claim 9, wherein said synthetic fibers are continuous fibers.

16. The method of claim 9, wherein the woven fabric component comprises monofilament warp yarns and monofilament fill yarns.

17. The method of claim 9, wherein said weave construction of said woven fabric component is a plain weave.

18. The method of claim 9, further comprising bonding said nonwoven fabric component by needle-punching.

19. The method of claim 18, further comprising calendaring said nonwoven fabric component.

20. The method as defined in claim 9, wherein the needle-punching has a needling range of about 300 punches per square inch to about 400 punches per square inch.

21. The method of claim 9, wherein the needle-punching has a needling range of about 300 punches per square inch to about 400 punches per square inch.

22. The method of claim 9, wherein the nonwoven fabric component comprises synthetic fibers selected from the group consisting of polypropylene, nylon, polyester, polyethylene, and combinations thereof.

* * * * *